(12) United States Patent
Tang (10) Patent No.: US 11,349,628 B2
(45) Date of Patent: May 31, 2022

(54) RESOURCE INDICATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 237 days.

(21) Appl. No.: 16/621,673

(22) PCT Filed: Sep. 13, 2017

(86) PCT No.: PCT/CN2017/101656
§ 371 (c)(1),
(2) Date: Dec. 11, 2019

(87) PCT Pub. No.: WO2019/051695
PCT Pub. Date: Mar. 21, 2019

(65) Prior Publication Data
US 2020/0127782 A1    Apr. 23, 2020

(51) Int. Cl.
*H04L 5/00*        (2006.01)
*H04W 72/04*    (2009.01)
*H04W 72/12*    (2009.01)

(52) U.S. Cl.
CPC .......... *H04L 5/0094* (2013.01); *H04L 5/0046* (2013.01); *H04W 72/042* (2013.01);
(Continued)

(58) Field of Classification Search
CPC ... H04L 5/0005; H04L 5/0044; H04L 5/0046; H04L 5/0091; H04L 5/0092;
(Continued)

(56) References Cited

U.S. PATENT DOCUMENTS

2018/0049203 A1* 2/2018 Xue ..................... H04W 72/042
2018/0063843 A1* 3/2018 Akkarakaran ........ H04L 5/0044
(Continued)

FOREIGN PATENT DOCUMENTS

| CN | 103220810 A | 7/2013 |
|---|---|---|
| EP | 2439995 A2 | 4/2012 |

(Continued)

OTHER PUBLICATIONS

3GPP TSG RAN WG1 Meeting #90; R1-1713185 Prague, Czech Republic Aug. 21-25, 2017.
(Continued)

*Primary Examiner* — Joshua Kading
(74) *Attorney, Agent, or Firm* — Young Basile Hanlon & MacFarlane, P.C.

(57) ABSTRACT

Disclosed are a resource indication method and device, and a computer storage medium. The method may include: a first device sends a first bitmap to a second device, the first bitmap being used for indicating a frequency domain resource for data or signaling transmission between the first device and the second device, and the first bitmap corresponding to at least two resource block group sizes.

16 Claims, 6 Drawing Sheets

(52) U.S. Cl.
CPC ... *H04W 72/1205* (2013.01); *H04W 72/1263* (2013.01); *H04W 72/1289* (2013.01); *H04L 5/0005* (2013.01)

(58) Field of Classification Search
CPC .. H04L 5/0094; H04L 27/2608; H04W 72/04; H04W 72/042; H04W 72/1205; H04W 72/1263; H04W 72/1278; H04W 72/1289
See application file for complete search history.

(56) References Cited

U.S. PATENT DOCUMENTS

| | | | |
|---|---|---|---|
| 2019/0229986 A1* | 7/2019 | Chen | H04W 72/04 |
| 2019/0260548 A1* | 8/2019 | Parkvall | H04W 72/042 |
| 2020/0067665 A1* | 2/2020 | Dou | H04W 72/1289 |
| 2020/0235894 A1* | 7/2020 | Takeda | H04L 5/0092 |

FOREIGN PATENT DOCUMENTS

| | | |
|---|---|---|
| WO | 2008137786 A1 | 11/2008 |
| WO | 2013025547 A2 | 2/2013 |

OTHER PUBLICATIONS

3GPP TSG RAN WG1 Meeting NR#3; R1-1715690 Nagoya, Japan, Sep. 18-21, 2017.
European Examination Report for EP Application 17924962.8 dated Jan. 19, 2021. (5 pages).
Communication pursuant to Article 94(3) EPC for EP Application 17924962.8 dated May 7, 2021. (5 pages).
Extended EP Search Report for EP Application No. 17924962.8 dated Apr. 24, 2020.
3GPP TSG RAN WGl Meeting NR#3; Nagoya, Japan, Sep. 18-21, 2017; RI-1716004.
3GPP TSG RAN WG1 NR Ad-Hoc#2; Qingdao, P.R. China, Jun. 27-30, 2017; R11711499.

* cited by examiner

FIG. 1

A first device sends a first bitmap to a second device, the first bitmap corresponding to at least two resource block group sizes — 101

FIG. 2

A second device receives a first bitmap sent by a first device, the first bitmap corresponding to at least two resource block group sizes — 201

The second device transmits data or signaling based on frequency domain resources indicated by the first bitmap — 202

RESOURCE INDICATION METHOD AND DEVICE, AND COMPUTER STORAGE MEDIUM

CROSS-REFERENCE TO RELATED APPLICATION(S)

This application is a 371 application of International Application No. PCT/CN2017/101656, filed on Sep. 13, 2017, the entire disclosure of which is hereby incorporated by reference.

TECHNICAL FIELD

The present disclosure relates to a wireless communication technology, in particular to a resource indication method, a device and a computer storage medium.

BACKGROUND

Figure 1:
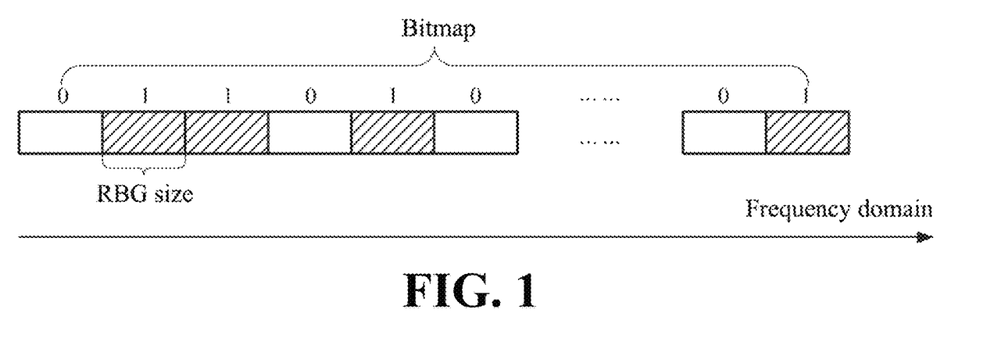
FIG. 1 is a schematic diagram of indicating resources by using a bitmap in the existing art.

In the existing Long Term Evolution (LTE) system, resource allocation may be indicated based on a bitmap, as shown in FIG. 1. For example, a bit in the bitmap indicates whether a resource block group (RBG) is allocated to a certain terminal, value 1 of the bit indicates the RBG is allocated to the terminal, and value 0 of the bit indicates the RBG is not allocated to the terminal. And a number of resource blocks (RBs) that an RBG contains, that is, an RBG size, is related to a system bandwidth.

In a 5G system, operating bandwidth of a terminal may be less than the system bandwidth, which may be called a bandwidth part. An RBG size and a number of RBGs do not vary with the system bandwidth, but are determined based on a bandwidth part adopted by the terminal. Since the number of bits contained in the bitmap is fixed and different bandwidth parts used by terminals may correspond to different RBG sizes, a number of bits actually used in the bitmap is often less than a maximum number, bits not used in the bitmap can only be filled with 0. This approach will cause waste of control signaling overhead and limit flexibility of scheduling.

SUMMARY

Implementations of the present disclosure provide a resource indication method, a device and a computer storage medium.

An implementation of the present disclosure provides a resource indication method. The method includes: a first device sends a first bitmap to a second device, wherein the first bitmap is used for indicating frequency domain resources for data or signaling transmission between the first device and the second device, and the first bitmap corresponds to at least two resource block group sizes.

In one implementation, a dimension of the first bitmap is a first number of bits. Herein a first part of bits in the first number of bits corresponds to a first resource block group size, and a second part of bits in the first number of bits corresponds to a second resource block group size.

In one implementation, the first resource block group size is larger than the second resource block group size.

In one implementation, the first bitmap is used for indicating frequency domain resources in a bandwidth including N resource blocks, and the first part of bits and the second part of bits satisfy:

$N = B1 \times P1 + B2 \times P2$, or $N = B1 \times P1 + B2 \times P2 - N_A$;

wherein B1 represents a number of the first part of bits, B2 represents a number of the second part of bits, and a sum of B1 and B2 is equal to the first number; P1 represents the first resource block group size, P2 represents the second resource block group size, and $N_A$ is less than P2.

In one implementation, the first resource block group size is twice as large as the second resource block group size.

In one implementation, sending, by the first device, the first bitmap to the second device includes: the first device sends the first bitmap through downlink control information (DCI).

In one implementation, the first device is a network device or a terminal device, and the second device is a terminal device.

An implementation of the present disclosure further provides a resource indication method. The method includes: a second device receives a first bitmap sent by a first device, and transmits data or signaling based on frequency domain resources indicated by the first bitmap, wherein the first bitmap corresponds to at least two resource block group sizes.

In one implementation, before transmitting the data or the signaling based on the frequency domain resources indicated by the first bitmap, the method further includes: the second device determines a distribution rule, and determines a position or position range, to which each resource block group size of the at least two resource block group sizes corresponds, in the first bitmap based on the distribution rule.

In one implementation, transmitting the data or the signaling based on the frequency domain resources indicated by the first bitmap includes: transmitting the data or the signaling based on the determined position or position range, to which each resource block corresponds, in the first bitmap.

In one implementation, determining, by the second device, the distribution rule includes: the second device determines a predefined distribution rule as the distribution rule.

In one implementation, determining, by the second device, the distribution rule includes: the second device receives first signaling, and determines the distribution rule based on an indication of the first signaling.

In one implementation, determining, by the second device, the distribution rule includes: the second device receives first signaling, and determines at least two candidate distribution rules based on an indication of the first signaling; and the second device receives second signaling, and determines one of the at least two candidate distribution rules as the distribution rule based on an indication of the second signaling.

In one implementation, the second signaling is downlink control information or Media Access Control (MAC) Control Element (CE) information.

In one implementation, the first signaling is Radio Resource Control (RRC) control signaling or system signaling.

In one implementation, the distribution rule is used for indicating a position range of at least two position ranges or a specific bit position, to which any one resource block group size of the at least two resource block group sizes corresponds, included in a length of the first bitmap.

In one implementation, the second device is a terminal device, and the first device is a network device or a terminal device.

An implementation of the present disclosure further provides a device. The device includes: a sending unit, configured to send a first bitmap to another device, wherein the first bitmap is used for indicating frequency domain resources for data or signaling transmission between the device and the another device, and the first bitmap corresponds to at least two resource block group sizes.

In one implementation, the device further includes: a first determining unit, configured to determine a first part of bits in a first number of bits corresponding to a first resource block group size, and determine a second part of bits in the first number of bits corresponding to a second resource block group size, wherein a dimension of the first bitmap is the first number of bits.

In one implementation, the first resource block group size is larger than the second resource block group size.

In one implementation, the first bitmap is used for indicating frequency domain resources in a bandwidth including N resource blocks, and the first determining unit is configured to determine that the first part of bits and the second part of bits satisfy:

$$N=B1\times P1+B2\times P2, \text{ or } N=B1\times P1+B2\times P2-N_\Delta;$$

wherein B1 represents a number of the first part of bits, B2 represents a number of the second part of bits, and a sum of B1 and B2 is equal to the first number; P1 represents the first resource block group size, P2 represents the second resource block group size, and $N_\Delta$ is less than P2.

In one implementation, the first resource block group size is twice as large as the second resource block group size.

In one implementation, the sending unit is configured to send the first bitmap through DCI.

In one implementation, the device is a network device or a terminal device, and the another device is a terminal device.

An implementation of the present disclosure further provides a device which includes: a receiving unit and a transmitting unit.

The receiving unit is configured to receive a first bitmap sent by another device, wherein the first bitmap corresponds to at least two resource block group sizes.

The transmitting unit is configured to transmit data or signaling based on frequency domain resources indicated by the first bitmap received by the receiving unit.

In one implementation, the device further includes: a second determining unit, configured to determine a distribution rule before the transmitting unit transmits the data or the signaling based on the frequency domain resources indicated by the first bitmap, and determine a position or position range, to which each resource block group size of the at least two resource block group sizes corresponds, in the first bitmap based on the distribution rule.

In one implementation, the transmitting unit is configured to transmit data or signaling based on the position or position range, to which each resource block group size corresponds, in the first bitmap, the position or position range is determined by the second determining unit.

In one implementation, the second determining unit is configured to determine a predefined distribution rule as the distribution rule.

In one implementation, the receiving unit is further configured to receive first signaling; and the second determining unit is configured to determine the distribution rule based on an indication of the first signaling received by the receiving unit.

In one implementation, the receiving unit is further configured to receive first signaling and second signaling; and the second determining unit is configured to determine at least two candidate distribution rules based on an indication of the first signaling received by the receiving unit, and determine one of the at least two candidate distribution rules as the distribution rule based on an indication of the second signaling received by the receiving unit.

In one implementation, the receiving unit is configured to receive downlink control information or MAC CE information as the second signaling.

In one implementation, the receiving unit is configured to receive RRC control signaling or system signaling as the first signaling.

In one implementation, the distribution rule is used for indicating a position range of at least two position ranges or a specific bit position, to which any one resource block group size of the at least two resource block group sizes corresponds, included in a length of the first bitmap.

In one implementation, the device is a terminal device, and the another device is a network device or a terminal device.

An implementation of the present disclosure further provides a computer storage medium on which computer instructions are stored, when the computer instructions are executed by a processor, acts of the resource indication method applied to the first device according to the implementation of the present disclosure are implemented; or, when the computer instructions are executed by the processor, acts of the resource indication method applied to the second device according to the implementation of the present disclosure are implemented.

An implementation of the present disclosure further provides a device, which includes: a communication component used for data transmission, a memory, a processor and a computer program stored on the memory and executable on the processor. When the processor executes the computer program, acts of the resource indication method applied to the first device according to the implementation of the present disclosure are implemented; or, when the processor executes the computer program, acts of the resource indication method applied to the second device according to the implementation of the present disclosure are implemented.

According to the resource indication method, device and computer storage medium provided by implementations of the present disclosure, in one aspect, the first device sends the first bitmap to the second device, the first bitmap is used for indicating frequency domain resources for data or signaling transmission between the first device and the second device, and the first bitmap corresponds to at least two resource block group sizes. In another aspect, the second device receives the first bitmap sent by the first device, and transmits data or signaling based on the frequency domain resources indicated by the first bitmap, and the first bitmap corresponds to at least two resource block group sizes.

DETAILED DESCRIPTION

The present disclosure will be described in further detail below with reference to accompanying drawings and specific implementations.

Implementation One

Figure 2:
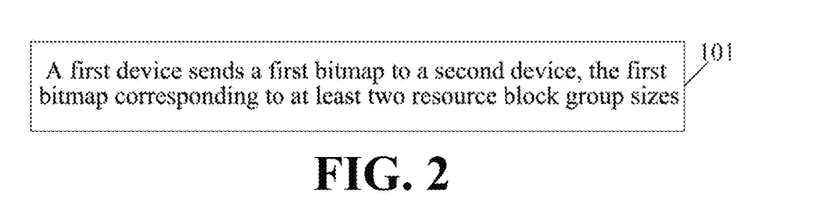
FIG. 2 is a schematic flowchart of a resource indication method according to implementation one of the present disclosure.

An implementation of the present disclosure provides a resource indication method. FIG. 2 is a schematic flowchart of a resource indication method according to implementation one of the present disclosure. As shown in FIG. 2, the method includes act 101.

In act 101, a first device sends a first bitmap to a second device, the first bitmap is used for indicating frequency domain resources for data or signaling transmission between the first device and the second device, and the first bitmap corresponds to at least two resource block group sizes.

In this implementation, the first device is a network device or a terminal device, and the second device is a terminal device.

In this implementation, a resource block group size indicates a number of Physical Resource Blocks (PRBs) included in the resource block group. For example, the resource block group size (i.e., the number of PRBs included) may be 1, 2, 4, 8, 16 . . . .

In this implementation, a dimension of the first bitmap is a first number of bits; that is, a length of the first bitmap is the first number of bits. Herein, a first part of bits in the first number of bits corresponds to a first resource block group size, and a second part of bits in the first number of bits corresponds to a second resource block group size.

As an implementation, the first resource block group size is larger than the second resource block group size. The first bitmap is used for indicating frequency domain resources in a bandwidth including N resource blocks, N may represent a size of a bandwidth part, and the size of the bandwidth part is related to a resource block group size. The first part of bits and the second part of bits satisfy:

$$N = B1 \times P1 + B2 \times P2 \quad (1)$$

$$\text{or, } N = B1 \times P1 + B2 \times P2 - N\Delta \quad (2)$$

wherein B1 represents a number of the first part of bits, B2 represents a number of the second part of bits, and a sum of B1 and B2 is equal to the first number; P1 represents the first resource block group size, P2 represents the second resource block group size, and $N_\Delta$ is less than P2.

The above expression (1) indicates that all bits in the first bitmap are configured for resource indication, and there is no waste of bits. The above expression (2) indicates that a number $N\Delta$ of bits in the first bitmap is not configured for resource indication, but $N_\Delta$ is smaller than the relatively small second resource block group size, and bits of the number $N\Delta$ are filled with 0.

As an implementation, the first resource block group size is twice as large as the second resource block group size. As can be seen from an enumeration that the resource block group size (i.e., the number of PRBs included) may be 1, 2, 4, 8, 16 . . . , the first resource block group size and the second resource block group size are two adjacent resource block group sizes. The second part of bits and the first part of bits satisfy:

$$B2 = \lceil N/P2 \rceil - B, \ B1 = B - B2;$$

wherein B1 represents a number of the first part of bits, B2 represents a number of the second part of bits, and B is the first number; P2 represents the second resource block group size; $\lceil \ \rceil$ presents rounding up.

By adopting the technical solution of the implementation of the present disclosure, under a condition that a length of the bitmap is kept unchanged, a number of unused bits in the bitmap is reduced and that some bits cannot be used is avoided through a resource indication of the first bitmap corresponding to at least two resource block group sizes, such that bits in the bitmap are used to a maximum extent. By selecting a best combination of scheduling granularities and using resource scheduling of various bandwidths, waste of control signaling overhead is greatly reduced, and scheduling flexibility is improved as well.

Implementation Two

Figure 3:
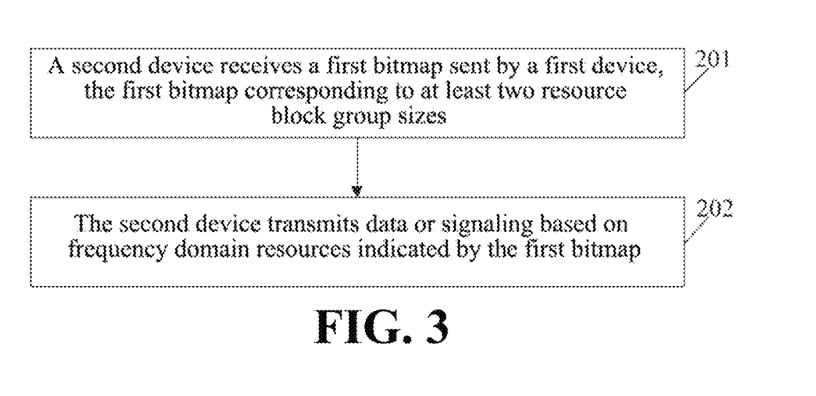
FIG. 3 is a schematic flowchart of a resource indication method according to implementation two of the present disclosure.

An implementation of the present disclosure further provides a resource indication method. FIG. 3 is a schematic flowchart of a resource indication method according to implementation two of the present disclosure. As shown in FIG. 3, the method includes acts 201 to 202.

In act 201, a second device receives a first bitmap sent by a first device, and the first bitmap corresponds to at least two resource block group sizes.

In act 202, the second device transmits data or signaling based on frequency domain resources indicated by the first bitmap.

In this implementation, the second device is a terminal device, and the first device is a network device or a terminal device.

In this implementation, the first bitmap is used for indicating frequency domain resources in a bandwidth including N resource blocks, N may represent a size of a bandwidth part, and the size of the bandwidth part is related to a resource block group size.

Figure 4:
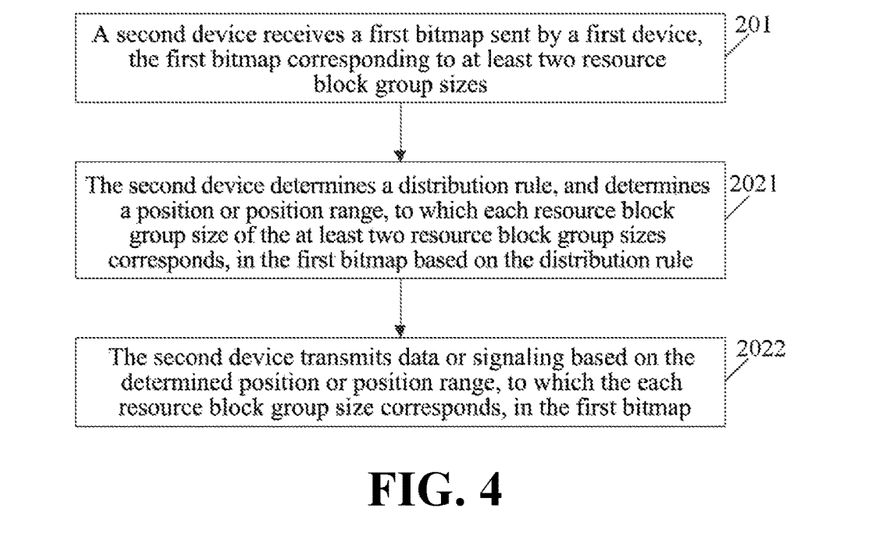
FIG. 4 is another schematic flowchart of a resource indication method according to implementation two of the present disclosure.

As an implementation, FIG. 4 is another schematic flowchart of a resource indication method according to implementation two of the present disclosure. As shown in FIG. 4, the act 202 may specifically include acts 2021 to 2022.

In act 2021, the second device determines a distribution rule, and determines a position or position range, to which each resource block group size of the at least two resource block group sizes corresponds, in the first bitmap based on the distribution rule.

In act 2022, the second device transmits data or signaling based on the determined position or position range, to which each resource block group size corresponds, in the first bitmap.

In this implementation, the distribution rule indicates distribution of at least two resource block group sizes in the first bitmap, and is specifically used for indicating a position range of at least two position ranges or a specific bit position, to which any one resource block group size of the at least two resource block group sizes corresponds, included in a length of the first bitmap. The terminal may transmit data or signaling based on the distribution of each resource block group size in the first bitmap. In a practical application, the length of the first bitmap may be divided into at least two position ranges, and each resource block group size may correspond to one of the at least two position ranges. For example, the length of the first bitmap is divided into three position ranges which include the $1^{st}$ bit to $a^{th}$ bit, the $(a+1)^{th}$ bit to $b^{th}$ bit, and the $(b+1)^{th}$ bit to $c^{th}$ bit, where a is less than b and b is less than c. It may be understood as the first bitmap is divided into a low order bit range, a middle order bit range or a high order bit range, and the each resource block group size may correspond to the low order bit range, the middle order bit range or the high order bit range. As another implementation, the each resource block group size may correspond to a specific bit position.

As a first implementation, determining, by the second device, the distribution rule includes: the second device determines a predefined distribution rule as the distribution rule. Specifically, a distribution rule may be predefined in the second device, and a position or position range, to which each resource block group size of the at least two resource block group sizes corresponds, in the first bitmap is determined based on the distribution rule.

As a second implementation, determining, by the second device, the distribution rule includes: the second device receives first signaling, and determines the distribution rule based on an indication of the first signaling. The first signaling is RRC control signaling or system signaling, and the second device may determine the distribution rule based on an indication of the RRC control signaling or the system signaling.

As a third implementation, determining, by the second device, the distribution rule includes: the second device receives first signaling, and determines at least two candidate distribution rules based on an indication of the first signaling; and the second device receives second signaling, and determines one of the at least two candidate distribution rules as the distribution rule based on an indication of the second signaling. The first signaling is RRC control signaling or system signaling, and the second signaling is downlink control information or MAC CE information.

Specifically, the second device may determine at least two candidate distribution rules based on the indication of the RRC control signaling or system signaling, and select one distribution rule from the at least two candidate distribution rules based on the downlink control information or the MAC CE information, and determine a position or position range, to which each resource block group size of the at least two resource block group sizes corresponds, in the first bitmap based on the distribution rule.

By adopting the technical solution of the implementation of the present disclosure, under a condition that a length of the bitmap is kept unchanged, a number of unused bits in the bitmap is reduced and that some bits cannot be used is avoided through a resource indication of the first bitmap corresponding to at least two resource block group sizes, such that bits in the bitmap are used to a maximum extent. By selecting a best combination of scheduling granularities and using resource scheduling of various bandwidths, waste of control signaling overhead is greatly reduced, and scheduling flexibility is improved as well.

The resource indication method of the implementation of the present disclosure will be described in detail below with reference to specific application scenarios.

Scenario One

In this scenario, a bitmap dimension of 25 bits is taken as an example.

For different sizes N of bandwidth parts (i.e., a bitmap is used for indicating frequency domain resources in a bandwidth including N resource blocks), a combination of two resource block group sizes is used. Herein, a first resource block group size is denoted as P1, a corresponding first part of bits is denoted as B1, a second resource block group size is denoted as P2, and a corresponding second part of bits is denoted as B2. A case where N can be exactly divided by P2 is shown in table 1, i.e., B=B1+B2 and N=B1×P1+B2×P2 are satisfied.

TABLE 1

| Size N of a bandwidth part (number of PRBs included) | RBG size P1 (number of PRBs included) | Number B1 of bits corresponding to P1 | RBG size P2 (number of PRBs included) | Number B2 of bits corresponding to P2 |
|---|---|---|---|---|
| 40 | 2 | 15 | 1 | 10 |
| 60 | 4 | 5 | 2 | 20 |
| 80 | 4 | 15 | 2 | 10 |
| 120 | 4 | 5 | 2 | 20 |
| 160 | 8 | 15 | 4 | 10 |
| 240 | 16 | 5 | 8 | 20 |

A case where N cannot be exactly divided by P2 is shown in table 2, i.e., B=B1+B2 and N=B1×P1+B2×P2−NΔ are satisfied.

TABLE 2

| Size of a bandwidth part (number of PRBs included) | RBG size P1 (number of PRBs included) | Number B1 of bits corresponding to P1 | RBG size P2 (number of PRBs included) | Number B2 of bits corresponding to P2 | $N_\Delta$ (number of PRBs included) |
|---|---|---|---|---|---|
| 59 | 4 | 5 | 2 | 20 | 1 |
| 79 | 4 | 15 | 2 | 10 | 1 |
| 119 | 4 | 5 | 2 | 20 | 1 |
| 158 | 8 | 15 | 4 | 10 | 2 |
| 236 | 16 | 5 | 8 | 20 | 4 |

A bitmap corresponding to one resource block group size adopted in the existing solution is as shown in table 3. From tables 3, 1 and 2, comparing the existing solution with the resource indication solution of the implementation of the present disclosure, numbers of bits wasted in the existing solution are all about 5 bits and 10 bits, while the maximum number of bits wasted in the resource indication solution of the implementation of the present disclosure is 4 bits.

TABLE 3

| Size of a bandwidth part (number of PRBs included) | RBG size (number of PRBs included) | Number of bits actually used | Number of bits wasted |
|---|---|---|---|
| 40 | 2 | 20 | 5 |
| 60 | 4 | 15 | 10 |
| 80 | 4 | 20 | 5 |
| 120 | 8 | 15 | 10 |
| 160 | 8 | 20 | 5 |
| 240 | 16 | 15 | 10 |

Scenario Two

Figure 5A:
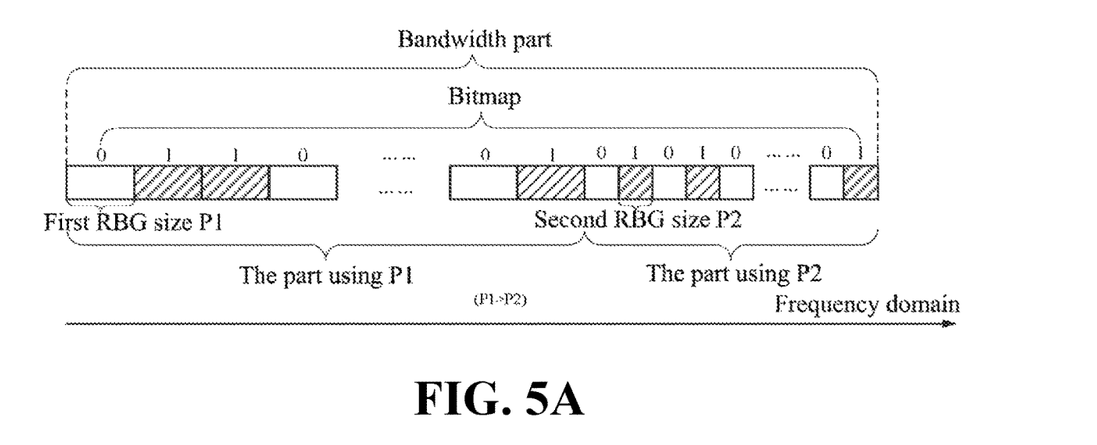
FIGS. 5A to 5D are respective schematic diagrams of indicating resources by using a bitmap in a resource indication method according to an implementation of the present disclosure.

For a size of a bandwidth part, a combination of two resource block group sizes is used. Herein, a first resource block group size is denoted as P1, a corresponding first part of bits is denoted as B1, a second resource block group size is denoted as P2, and a corresponding second part of bits is denoted as B2. In this scenario, P1 is greater than P2, and the distribution rule is that the first resource block group size P1 with a larger dimension is distributed in a low order bit range of the bandwidth part, and the second resource block group size P2 with a smaller dimension is distributed in a high order bit range of the bandwidth part, as shown in FIG. 5A.

Scenario Three

Figure 5B:
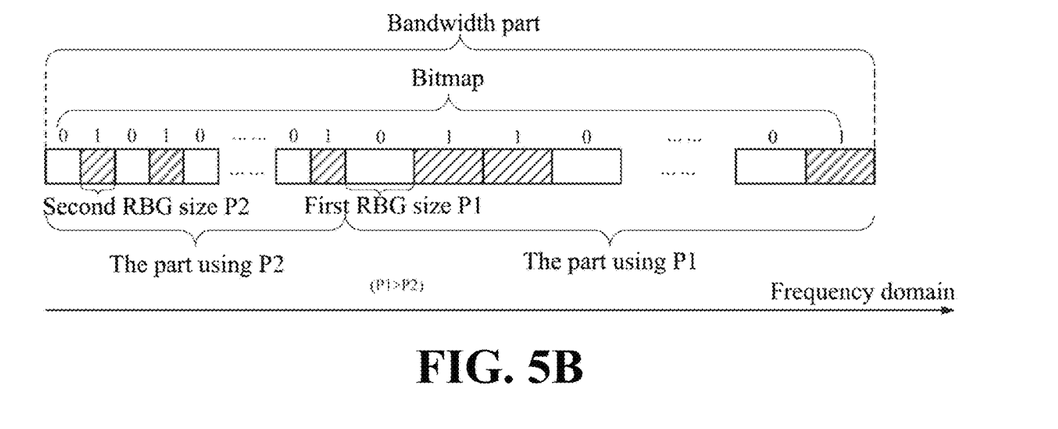

For a size of a bandwidth part, a combination of two resource block group sizes is used. Herein, a first resource block group size is denoted as P1, a corresponding first part of bits is denoted as B1, a second resource block group size is denoted as P2, and a corresponding second part of bits is denoted as B2. In this scenario, P1 is greater than P2, and the distribution rule is that the first resource block group size P1 with a larger dimension is distributed in a high order bit range of the bandwidth part, and the second resource block group size P2 with a smaller dimension is distributed in a low order bit range of the bandwidth part, as shown in FIG. 5B.

Scenario Four

Figure 5C:
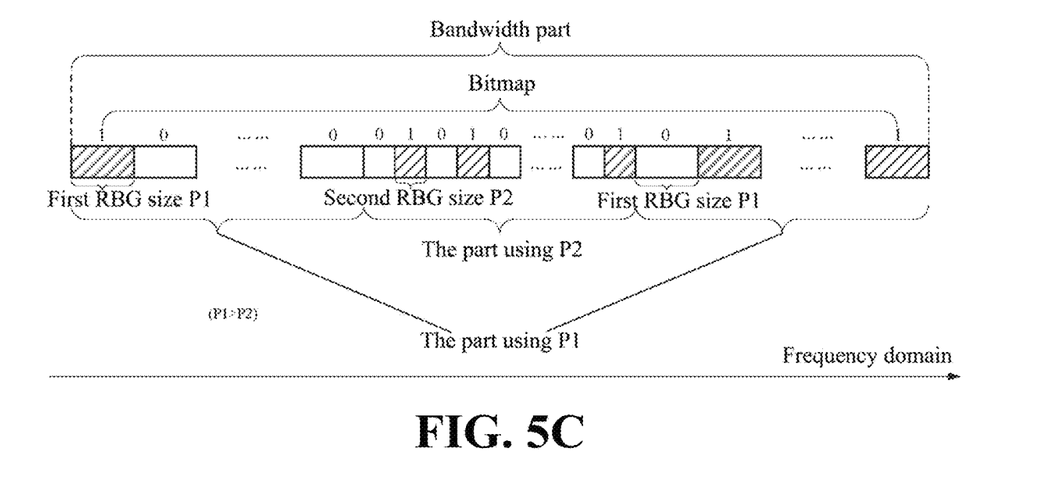

For a size of a bandwidth part, a combination of two resource block group sizes is used. Herein, a first resource block group size is denoted as P1, a corresponding first part of bits is denoted as B1, a second resource block group size is denoted as P2, and a corresponding second part of bits is denoted as B2. In this scenario, P1 is greater than P2, and the distribution rule is that the first resource block group size P1 with a larger dimension is distributed in a high order bit range and a low order bit range of the bandwidth part, and the second resource block group size P2 with a smaller dimension is distributed in a middle order bit range of the bandwidth part, as shown in FIG. 5C. The second resource block group size P2 with a smaller dimension is distributed at a specific location in the middle order bit range of the bandwidth part, which may be configured by first signaling, and the first signaling may be RRC control signaling or system signaling.

Scenario Five

Figure 5D:
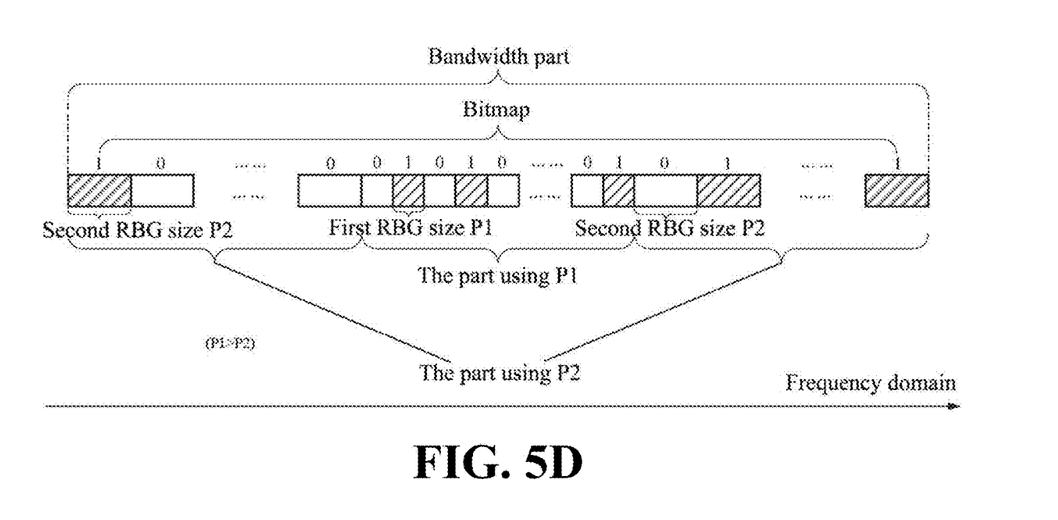

Contrary to scenario four, for a size of a bandwidth part, a combination of two resource block group sizes is used. Herein, a first resource block group size is denoted as P1, a corresponding first part of bits is denoted as B1, a second resource block group size is denoted as P2, and a corresponding second part of bits is denoted as B2. In this scenario, P1 is greater than P2, and the distribution rule is that the first resource block group size P1 with a larger dimension is distributed in a middle order bit range of the bandwidth part, and the second resource block group size P2 with a smaller dimension is distributed in a high order bit range and a low order bit range of the bandwidth part, as shown in FIG. 5D. The first resource block group size P1 with a larger dimension is distributed at a specific position in the middle order bit range of the bandwidth part, which may be configured by first signaling, and specifically the first signaling may be RRC control signaling or system signaling.

Based on the above scenarios two to five, in a practical application, the second device as a terminal device may determine distribution rules satisfying the above scenarios two to five as candidate distribution rules based on the first signaling, and further select one distribution rule from the candidate distribution rules based on the second signaling.

Implementation Three

Figure 6:
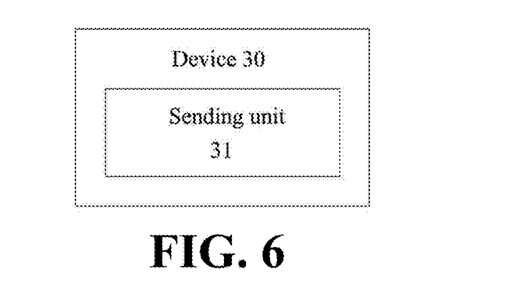
FIG. 6 is a schematic structural diagram of a device according to implementation three of the present disclosure.

An implementation of the present disclosure further provides a device, and FIG. 6 is a schematic structural diagram of the device according to implementation three of the present disclosure. As shown in FIG. 6, the device 30 includes a sending unit 31, configured to send a first bitmap to another device, wherein the first bitmap is used for indicating frequency domain resources for data or signaling transmission between the device and the another device, and the first bitmap corresponds to at least two resource block group sizes.

Figure 7:
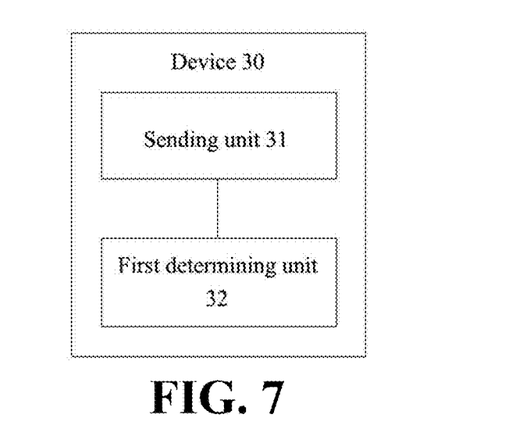
FIG. 7 is another schematic structural diagram of a device according to implementation three of the present disclosure.

As an implementation, FIG. 7 is another schematic structural diagram of the device according to implementation three of the present disclosure. As shown in FIG. 7, the device 30 further includes a first determining unit 32, configured to determine a first part of bits in a first number of bits corresponding to a first resource block group size, and determine a second part of bits in the first number of bits corresponding to a second resource block group size, wherein a dimension of the first bitmap is the first number of bits.

In this implementation, the first resource block group size is larger than the second resource block group size.

In one implementation, the first bitmap is used for indicating frequency domain resources in a bandwidth including N resource blocks, and the first determining unit 32 is configured to determine that the first part of bits and the second part of bits satisfy:

$$N = B1 \times P1 + B2 \times P2, \text{ or } N = B1 \times P1 + B2 \times P2 - N_A;$$

wherein B1 represents a number of the first part of bits, B2 represents a number of the second part of bits, and a sum of B1 and B2 is equal to the first number, P1 represents the first resource block group size, P2 represents the second resource block group size, and $N_A$ is less than P2.

In another implementation, the first resource block group size is twice as large as the second resource block group size.

In the implementation, the sending unit 31 is configured to send the first bitmap through DCI.

In the implementation of the present disclosure, the device 30 is a network device or a terminal device, and the another device is a terminal device. The first determining unit 32 of the device may be implemented by a Central Processing Unit (CPU), a Digital Signal Processor (DSP), a Microcontroller Unit (MCU) or a Field-Programmable Gate Array (FPGA) in a practical application. The sending unit 31 of the device may be implemented by a communication module group (including: a basic communication kit, an operating system, a communication module, a standardized interface and protocol, etc.) and a transceiving antenna in a practical application.

It should be noted that division of the aforementioned program modules is just taken as an example for description when the device provided in the implementation performs information processing, and in a practical application, the aforementioned processing may be allocated to and accomplished by different program modules as required, that is, an internal structure of the device may be divided into different program modules to accomplish all or part of the aforementioned processing. In addition, the device and the resource indication method provided by the aforementioned implementations belong to the same concept, and a specific implementation process of the device may refer to the method implementation in detail and will not be repeated here.

Implementation Four

Figure 8:
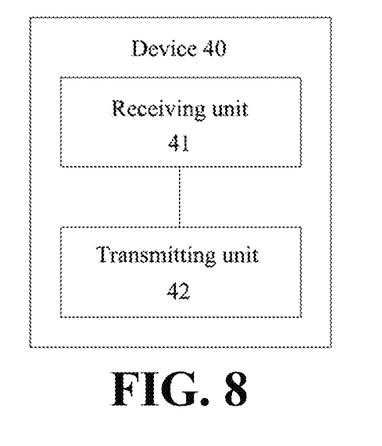
FIG. 8 is a schematic structural diagram of a device according to implementation four of the present disclosure.

An implementation of the present disclosure further provides a device. FIG. 8 is a schematic structural diagram of a device according to implementation four of the present disclosure. As shown in FIG. 8, the device 40 includes a receiving unit 41 and a transmitting unit 42.

The receiving unit 41 is configured to receive a first bitmap sent by another device, wherein the first bitmap corresponds to at least two resource block group sizes.

The transmitting unit 42 is configured to transmit data or signaling based on frequency domain resources indicated by the first bitmap received by the receiving unit 41.

Figure 9:
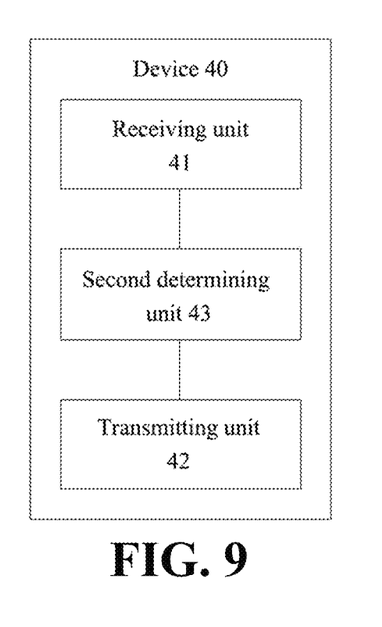
FIG. 9 is another schematic structural diagram of a device according to implementation four of the present disclosure.

As an implementation, FIG. 9 is another schematic structural diagram of the device according to implementation four of the present disclosure. As shown in FIG. 9, the device 40 further includes a second determining unit 43, configured to determine a distribution rule before the transmitting unit 42 transmits the data or signaling based on the frequency domain resources indicated by the first bitmap, and determine a position or position range, to which each resource block group size of the at least two resource block group sizes corresponds, in the first bitmap based on the distribution rule.

The transmitting unit 42 is configured to transmit the data or the signaling based on the position or the position range, to which each resource block group size corresponds, in the first bitmap, wherein the position or position range is determined by the second determining unit 43.

As a first implementation, the second determining unit 43 is configured to determine a predefined distribution rule as the distribution rule.

As a second implementation, the receiving unit 41 is further configured to receive first signaling, and the second determining unit 43 is configured to determine the distribution rule based on an indication of the first signaling received by the receiving unit 41.

As a third implementation, the receiving unit 41 is further configured to receive first signaling, and receive second signaling; the second determining unit 43 is configured to determine at least two candidate distribution rules based on an indication of the first signaling received by the receiving unit 41, and determine one of the at least two candidate distribution rules as the distribution rule based on an indication of the second signaling received by the receiving unit 41.

Herein, the receiving unit 41 is configured to receive downlink control information or MAC CE information as the second signaling.

Herein, the receiving unit 41 is configured to receive RRC control signaling or system signaling as the first signaling.

In this implementation, the distribution rule is used for indicating a position range of at least two position ranges or a specific bit position, to which any one resource block group size of the at least two resource block group size corresponds, included in a length of the first bitmap.

In the implementation of the present disclosure, the device is a terminal device, and the another device is a network device or a terminal device. The second determining unit 43 of the device may be implemented by a CPU, a DSP, a MCU or a FPGA in a practical application. The receiving unit 41 and transmitting unit 42 of the device may be implemented by a communication module group (including: a basic communication kit, an operating system, a communication module, a standardized interface and protocol, etc.) and a transceiving antenna in a practical application.

It should be noted that division of the aforementioned program modules is just taken as an example for description when the device provide in the aforementioned implementation performs information processing, and in a practical application, the aforementioned processing may be allocated to and accomplished by different program modules as required, that is, an internal structure of the device may be divided into different program modules to accomplish all or part of the aforementioned processing. In addition, the device and the resource indication method provided by the aforementioned implementations belong to the same concept, and a specific implementation process of the device may refer to the method implementation in detail.

Implementation Five

Figure 10:
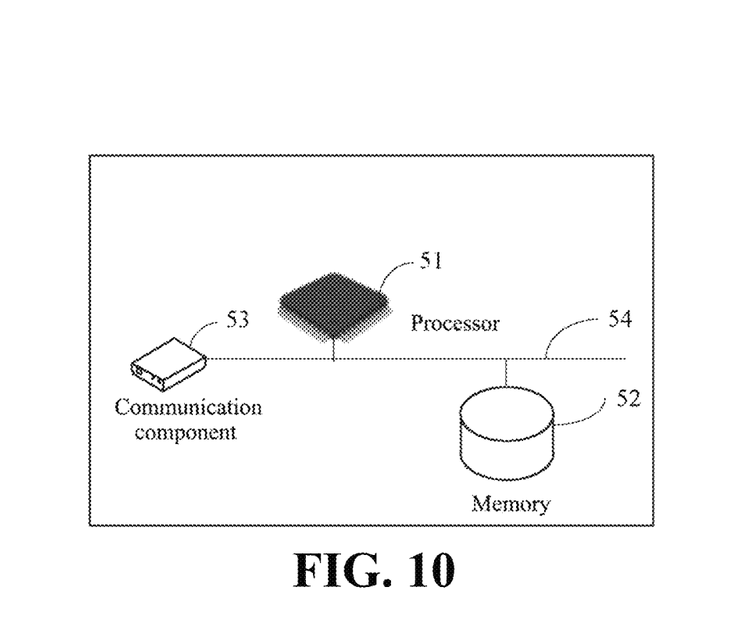
FIG. 10 is a schematic structural diagram of hardware of a device according to an implementation of the present disclosure.

An implementation of the present disclosure further provides a device. FIG. 10 is a schematic structural diagram of hardware of the device according to the implementation of the present disclosure. As shown in FIG. 10, the device includes a communication component 53 for data transmission, at least one processor 51, and a memory 52 for storing a computer program capable of running on the processor 51. Various components in the terminal are coupled together by a bus system 54. It can be understood that the bus system 54 is used for implementing connection and communication between these components. In addition to a data bus, the bus system 54 further includes a power bus, a control bus, and a status signal bus. However, for clarity, all kinds of buses are uniformly denoted as the bus system 54 in the FIG. 10.

It can be understood that the memory 52 may be a volatile memory or a non-volatile memory, or may include both the volatile memory and the non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 52 described in the implementation of the present disclosure is intended to include, but is not limited to, these and any other suitable types of memories.

Methods disclosed in above implementations of the present disclosure may be applied in the processor 51 or implemented by the processor 51. The processor 51 may be an integrated circuit chip with a signal processing capability. In an implementation process, acts of the methods described above may be accomplished by integrated logic circuits of hardware in the processor 51 or instructions in a form of software. The processor 51 described above may be a general purpose processor, a DSP or other programmable logic devices, a discrete gate or a transistor logic device, a discrete hardware component, etc. The processor 51 may implement or execute the disclosed methods, acts and logical block diagrams in the implementations of the present disclosure. The general purpose processor may be a microprocessor or any conventional processor or the like. Acts of the methods disclosed in combination with the implementations of the present disclosure may be directly embodied as being executed and accomplished by a hardware decoding processor or by a combination of hardware and software modules in a decoding processor. The software module may be located in a storage medium, and the storage medium is located in the memory 52. The processor 51 reads information in the memory 52 and accomplishes the acts of the aforementioned methods in combination with hardware thereof.

In an exemplary implementation, an device may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, Microprocessors or other electronic components, for executing the aforementioned methods.

As a first implementation, the device is a network device or a terminal device. When the processor 51 executes the program, it is implemented that a first bitmap is sent to another device, wherein the first bitmap is used for indicating frequency domain resources for data or signaling transmission between the device and the another device, and the first bitmap corresponds to at least two resource block group sizes.

In one implementation, when the processor 51 executes the program, it is implemented that a first part of bits in a first number of bits corresponding to a first resource block group size is determined, and a second part of bits in the first number of bits corresponding to a second resource block group size is determined, wherein a dimension of the first bitmap is the first number of bits.

In one implementation, the first resource block group size is larger than the second resource block group size.

In one implementation, the first bitmap is used for indicating frequency domain resources in a bandwidth including N resource blocks. When the processor 51 executes the program, it is implemented that the determined first part of bits and second part of bits satisfy:

$$N=B1 \times P1+B2 \times P2, \text{ or } N=B1 \times P1+B2 \times P2-N_A;$$

wherein B1 represents a number of the first part of bits, B2 represents a number of the second part of bits, and a sum of B1 and B2 is equal to the first number; P1 represents the first resource block group size, P2 represents the second resource block group size, and $N_A$ is less than P2.

In one implementation, the first resource block group size is twice as large as the second resource block group size.

In one implementation, when the processor 51 executes the program, it is implemented that the first bitmap is sent through downlink control information.

As a second implementation, the device is a terminal device. When the processor 51 executes the program, it is implemented that a first bitmap sent by another device is received, and data or signaling is transmitted based on frequency domain resources indicated by the first bitmap, wherein the first bitmap corresponds to at least two resource block group sizes.

In one implementation, when the processor 51 executes the program, it is implemented that before the data or signaling is transmitted based on the frequency domain resources indicated by the first bitmap, a distribution rule is determined, and a position or position range, to which each resource block group size of the at least two resource block group sizes corresponds, in the first bitmap is determined based on the distribution rule.

In one implementation, when the processor 51 executes the program, it is implemented that the data or the signaling is transmitted based on the determined position or position range, to which each resource block group size corresponds, in the first bitmap.

In one implementation, when the processor 51 executes the program, it is implemented that a predefined distribution rule is determined as the distribution rule.

In one implementation, when the processor 51 executes the program, it is implemented that first signaling is received, and the distribution rule is determined based on an indication of the first signaling.

In one implementation, when the processor 51 executes the program, it is implemented that first signaling is received, and at least two candidate distribution rules are determined based on an indication of the first signaling; second signaling is received, and one of the at least two candidate distribution rules is determined as the distribution rule based on an indication of the second signaling.

Herein, the second signaling is downlink control information or MAC CE information.

Herein, the first signaling is radio resource control (RRC) control signaling or system signaling.

Herein, the distribution rule is used for indicating a position range of at least two position ranges or a specific bit position, to which any one resource block group size of the at least two resource block group sizes corresponds, included in a length of the first bitmap.

Implementation Six

An implementation of the present disclosure further provides a computer storage medium, including, for example, the memory 52 shown in FIG. 10, on which a computer program is stored, and the computer program may be executed by the processor 51 of the device to accomplish the acts of the aforementioned methods. The computer storage medium may be a memory such as a FRAM, a ROM, a PROM, an EPROM, an EEPROM, a Flash Memory, a magnetic surface memory, a Compact Disc, or a CD-ROM; or may be various devices including one or any combination of the above memories.

As a first implementation, the computer storage medium of the implementation of the present disclosure has a computer program stored thereon. When the computer program is executed by a processor, it is implemented that a first bitmap is sent to another device, wherein the first bitmap is used for indicating frequency domain resources for data or signaling transmission between the device and the another device, and the first bitmap corresponds to at least two resource block group sizes.

In one implementation, when the computer program is executed by the processor, it is implemented that a first part of bits in a first number of bits corresponding to a first resource block group size is determined, and a second part of bits in the first number of bits corresponding to a second resource block group size is determined, wherein a dimension of the first bitmap is the first number of bits.

In one implementation, the first resource block group size is larger than the second resource block group size.

In one implementation, the first bitmap is used for indicating frequency domain resources in a bandwidth including N resource blocks. When the computer program is executed by the processor, it is implemented that the determined first part of bits and second part of bits satisfy:

$$N=B1{\times}P1+B2{\times}P2, \text{ or } N=B1{\times}P1+B2{\times}P2-N_\Delta;$$

wherein B1 represents a number of the first part of bits, B2 represents a number of the second part of bits, and a sum of B1 and B2 is equal to the first number; P1 represents the first resource block group size, P2 represents the second resource block group size, and $N_\Delta$ is less than P2.

In one implementation, the first resource block group size is twice as large as the second resource block group size.

In one implementation, when the computer program is executed by the processor, it is implemented that the first bitmap is sent through downlink control information.

As a second implementation, the computer storage medium of the implementation of the present disclosure has a computer program stored thereon, and when the computer program is executed by a processor, it is implemented that a first bitmap sent by another device is received, and data or signaling is transmitted based on frequency domain resources indicated by the first bitmap, wherein the first bitmap corresponds to at least two resource block group sizes.

In one implementation, when the computer program is executed by the processor, it is implemented that a distribution rule is determined before the data or signaling is transmitted based on the frequency domain resources indicated by the first bitmap, and a position or position range, to which each resource block group size of the at least two resource block group sizes corresponds, in the first bitmap is determined based on the distribution rule.

In one implementation, when the computer program is executed by the processor, it is implemented that the data or signaling is transmitted based on the determined position or position range, to which each resource block group size corresponds, in the first bitmap.

In one implementation, when the computer program is executed by the processor, it is implemented that a predefined distribution rule is determined as the distribution rule.

In one implementation, when the computer program is executed by the processor, it is implemented that first signaling is received, and the distribution rule is determined based on an indication of the first signaling.

In one implementation, when the computer program is executed by the processor, it is implemented that first signaling is received, and at least two candidate distribution rules are determined based on an indication of the first signaling; second signaling is received, and one of the at least two candidate distribution rules is determined as the distribution rule based on an indication of the second signaling.

Herein, the second signaling is downlink control information or MAC CE information.

Herein, the first signaling is radio resource control (RRC) control signaling or system signaling.

Herein, the distribution rule is used for indicating a position range of at least two position ranges or a specific bit position, to which any one resource block group size of the at least two resource block group sizes corresponds, included in a length of the first bitmap.

In several implementations provided by the present application, it should be understood that the disclosed device and method may be implemented in other ways. The device implementations described above are only exemplary, for example, the division of the units is only a logical function division, and there may be other division modes in an actual implementation. For example, multiple units or components may be combined or integrated into another system, or some features may be ignored or not executed. In addition, the mutual coupling or direct coupling or communication connection between various components shown or discussed may be indirect coupling or communication connection through some interfaces, apparatuses or units, and may be electrical, mechanical or in other forms.

The units described as separate components may or may not be physically separated, and the component shown as a unit may or may not be a physical unit, i.e., it may be located in one place or may be distributed over multiple network units. Some or all of the units may be selected according to practical requirements to achieve a purpose of the solution of the implementation.

In addition, various functional units in various implementations of the present disclosure may be integrated in one processing unit, or each unit may act as a single unit respectively, or two or more units may be integrated in one unit. The above-mentioned integrated units may be implemented in a form of hardware or in a form of hardware plus software functional units.

One ordinary skilled in the art can understand that, all or part of the acts for implementing the above method implementations may be accomplished by a program instructing related hardware, and the aforementioned program may be stored in a computer readable storage medium. The program, when executed, performs acts including the above method implementations. The aforementioned storage medium includes various media capable of storing program codes, such as a removable storage device, a ROM, a RAM, a magnetic disk or a compact disk.

Alternatively, the integrated units described above in the present disclosure may be stored in a computer readable storage medium if implemented in a form of software functional module and sold or used as a separate product. Based on this understanding, the technical solutions in the implementations of the present disclosure, in essence, or the part contributing to the prior art, may be embodied in the form of a software product stored in a storage medium, including a plurality of instructions for causing a computer device (which may be a personal computer, a server, or a network device, etc.) to perform all or part of the methods described in various implementations of the present disclosure. And the aforementioned storage medium includes various media capable of storing program codes, such as a removable storage device, a ROM, a RAM, a magnetic disk or an optical disk.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subjected to the protection scope of the claims.

I claim:

1. A method for resource indication, comprising:
   sending, by a first device, a first bitmap to a second device, wherein the first bitmap is used for indicating frequency domain resources in a bandwidth for data or signaling transmission between the first device and the second device, and the first bitmap corresponds to at least two resource block group sizes; and transmitting, by the second device, data or signaling on the frequency domain resources in the bandwidth indicated by the first bitmap, wherein the bandwidth comprises N resource blocks, a dimension of the first bitmap is a first number of bits, a first part of bits in the first number of bits corresponds to a first resource block group size, and a second part of bits in the first number of bits corresponds to a second resource block group size, wherein the first resource block group size is twice as large as the second resource block group size, and the first part of bits and the second part of bits of the first bitmap satisfy:

$$N=B1\times P1+B2\times P2 \text{ or, } N=B1\times P1+B2\times P2-N\Delta, \text{ and}$$

wherein B1 represents a number of the first part of bits, B2 represents a number of the second part of bits, a sum of B1 and B2 is equal to the first number, P1 represents the first resource block group size, P2 represents the second resource block group size, and NA is an integer number less than P2 and larger than zero.

2. The method of claim 1, wherein sending, by the first device, the first bitmap to the second device, comprises:
sending, by the first device, the first bitmap through downlink control information (DCI).

3. The method of claim 1, wherein the first device is a network device or a terminal device, and the second device is a terminal device.

4. A method for resource indication, comprising:
receiving, by a second device, a first bitmap sent by a first device; and
transmitting, by the second device, data or signaling based on frequency domain resources in a bandwidth indicated by the first bitmap,
wherein the first bitmap corresponds to at least two resource block group sizes,
wherein the bandwidth comprises N resource blocks, a dimension of the first bitmap is a first number of bits, a first part of bits in the first number of bits corresponds to a first resource block group size, a second part of bits in the first number of bits corresponds to a second resource block group size,
wherein the first resource block group size is twice as large as the second resource block group size, and the first part of bits and the second part of bits of the first bitmap satisfy:

$$N=B1\times P1+B2\times P2 \text{ or, } N=B1\times P1+B2\times P2-N\Delta, \text{ and}$$

wherein B1 represents a number of the first part of bits, B2 represents a number of the second part of bits, a sum of B1 and B2 is equal to the first number, P1 represents the first resource block group size, P2 represents the second resource block group size, and NA is an integer number less than P2 and larger than zero.

5. The method of claim 4, wherein the method further comprises:
before transmitting the data or the signaling based on the frequency domain resources in the bandwidth indicated by the first bitmap,
determining, by the second device, a distribution rule, and determining a position or position range, to which each resource block group size of the at least two resource block group sizes corresponds, in the first bitmap based on the distribution rule.

6. The method of claim 5, wherein transmitting the data or the signaling based on the frequency domain resources in the bandwidth indicated by the first bitmap comprises:
transmitting the data or the signaling based on the determined position or position range, to which the each resource block group size corresponds, in the first bitmap.

7. The method of claim 5, wherein determining, by the second device, the distribution rule, comprises:
determining, by the second device, a predefined distribution rule as the distribution rule.

8. The method of claim 5, wherein determining, by the second device, the distribution rule, comprises:
receiving, by the second device, first signaling, and determining the distribution rule based on an indication of the first signaling.

9. The method of claim 5, wherein determining, by the second device, the distribution rule, comprises:
receiving, by the second device, first signaling, and determining at least two candidate distribution rules based on an indication of the first signaling; and
receiving, by the second device, second signaling, and determining one of the at least two candidate distribution rules as the distribution rule based on an indication of the second signaling.

10. The method of claim 9, wherein the second signaling is downlink control information or Media Access Control (MAC) Control Element (CE) information.

11. The method of claim 8, wherein the first signaling is radio resource control (RRC) control signaling or system signaling.

12. The method of claim 5, wherein the distribution rule is used for indicating a position range of at least two position ranges or a specific bit position, to which any one resource block group size of the at least two resource block group sizes corresponds, included in a length of the first bitmap.

13. The method of claim 4, wherein the second device is a terminal device, and the first device is a network device or a terminal device.

14. A system, comprising a first device and a second device,
wherein the first device is configured to send a first bitmap to the second device, the first bitmap is used for indicating frequency domain resources in a bandwidth for data or signaling transmission between the first device and the second device, and the first bitmap corresponds to at least two resource block group sizes,
wherein the second device is configured to transmit data or signaling on the frequency domain resources in the bandwidth indicated by the first bitmap,
wherein the bandwidth comprises N resource blocks, a dimension of the first bitmap is a first number of bits, a first part of bits in the first number of bits corresponds to a first resource block group size, and a second part of bits in the first number of bits corresponds to a second resource block group size,
wherein the first resource block group size is twice as large as the second resource block group size, and the first part of bits and the second part of bits of the first bitmap satisfy:

$$N=B1\times P1+B2\times P2 \text{ or, } N=B1\times P1+B2\times P2-N\Delta, \text{ and}$$

wherein B1 represents a number of the first part of bits, B2 represents a number of the second part of bits, a sum of B1 and B2 is equal to the first number, P1 represents the first resource block group size, P2 represents the second resource block group size, and NA is an integer number less than P2 and larger than zero.

15. A device, comprising a processor connected with a memory, wherein the processor is configured receive a first bitmap sent by another device; and transmit data or signaling based on frequency domain resources in a bandwidth indicated by the first bitmap, wherein the first bitmap corresponds to at least two resource block group sizes, wherein the bandwidth comprises N resource blocks, a dimension of the first bitmap is a first number of bits, a first part of bits in the first number of bits corresponds to a first resource block group size, and a second part of bits in the first number of bits corresponds to a second resource block group size, wherein the first resource block group size is twice as large as the second resource block group size, and the first part of bits and the second part of bits of the first bitmap satisfy:

$N=B1 \times P1+B2 \times P2$ or, $N=B1 \times P1+B2 \times P2-NA$, and wherein B1 represents a number of the first part of bits, B2 represents a number of the second part of bits, a sum of B1 and B2 is equal to the first number, P1 represents the first resource block group size, P2 represents the second resource block group size, and NA is an integer number less than P2 and larger than zero.

16. The device of claim 15, wherein the processor is configured to, before transmitting the data or the signaling based on the frequency domain resources in the bandwidth indicated by the first bitmap, determine a distribution rule, and determine a position or position range, to which each resource block group size of the at least two resource block group sizes corresponds, in the first bitmap based on the distribution rule.

* * * * *